United States Patent
Peach et al.

[11] Patent Number: 5,822,312
[45] Date of Patent: Oct. 13, 1998

[54] REPEATERS FOR MULTIBEAM SATELLITES

[75] Inventors: Robert Peach; Nigel Miller, both of Cambridge; Bharat Tailor, Kitchener; Kamal Ali, Mississauga; Gary Beauchamp, Cambridge; Simon Lam, Kitchener; Ken Lazaris-Brunner, Burlington, all of Canada

[73] Assignee: COM DEV Limited, Cambridge, Canada

[21] Appl. No.: 633,676

[22] Filed: Apr. 17, 1996

[30] Foreign Application Priority Data

Aug. 30, 1995 [CA] Canada ................................... 2157209

[51] Int. Cl.[6] .................................................. H04B 7/185
[52] U.S. Cl. .......................... 370/323; 370/492; 455/428
[58] Field of Search .................................... 370/316, 315, 370/319, 492, 534, 535, 536, 537, 542, 323, 325; 455/12.1, 13.2, 13.3, 427, 428; 342/352

[56] References Cited

U.S. PATENT DOCUMENTS

| | | | |
|---|---|---|---|
| 3,548,108 | 12/1970 | Yamato et al. | 370/319 |
| 3,636,452 | 1/1972 | Nuding | 325/3 |
| 4,029,902 | 6/1977 | Bell, Jr. et al. | 370/497 |
| 4,144,495 | 3/1979 | Metzger | 455/17 |
| 4,228,401 | 10/1980 | Wachs et al. | 455/13.3 |
| 4,242,756 | 12/1980 | Huffman et al. | 455/8 |
| 4,381,562 | 4/1983 | Acampora | 370/323 |
| 4,425,639 | 1/1984 | Acampora et al. | 370/323 |
| 4,456,988 | 6/1984 | Nakagome et al. | 370/323 |
| 4,691,882 | 9/1987 | Young | 244/158 R |

(List continued on next page.)

FOREIGN PATENT DOCUMENTS

| | | | |
|---|---|---|---|
| 1084183 | 8/1980 | Canada | H04Q 11/02 |
| 2066712 | 5/1991 | Canada | H04B 7/185 |
| 2068875 | 5/1991 | Canada | H04Q 7/00 |
| 2073336 | 9/1991 | Canada | H04B 7/19 |
| 2061090 | 9/1992 | Canada | H04B 7/26 |
| 2087542 | 11/1992 | Canada | H04B 7/26 |
| 2089043 | 9/1993 | Canada | H04Q 7/04 |
| 2114851 | 12/1993 | Canada | H04B 7/26 |
| 2125371 | 1/1995 | Canada | H04B 7/26 |
| 59-149434 | 8/1984 | Japan | H04B 7/185 |

OTHER PUBLICATIONS

"The Application of Surface Acoustic Wave Filters to Communications Satellite Design" AIAA–94–1007–CP, pp. 707–715 R.C. Peach, F.Z. Bi and B. Van Osch COM DEV Ltd., Cambridge, Ontario, Danada.

SS/FDMA System for Digital Transmission "Application of Bandwidth–Variable SAW Filter Matrix for Efficient Interbeam Connection in Multibeam Satellite" H. Shinonaga and Y. Ito KDD R&D Laboratories Nakameguro 2–1–23, Meguro, Tokyo 153 Japan.

*Primary Examiner*—Hassan Kizou
*Assistant Examiner*—A. Bnimoussa
*Attorney, Agent, or Firm*—Jones, Day, Reavis & Pogue

[57] ABSTRACT

A repeater for a multibeam communications satellite combines the features of coaxial channel interbeam switching and subchannelization of some of the channels. In one embodiment described, the input radio-frequency signals from the input beams are fed through the input multiplexers to form channels. Some, but not all, channels are subsequently subchannelized for interbeam switching. In another embodiment of the invention, a portion of the incoming radio frequency signals bypasses the input demultiplexer and is filtered for noise-limiting reasons, converted down to an intermediate frequency and then subchannelized using SAW filters. The specification also teaches that digital techniques can be used to obtain the same results. Especially in the case of satellites with a large number of beams and a large number of channels, it is not necessary to have full interbeam switching of all the subchannels derived from one channel: instead, the specification proposes the use of parallel configurations of smaller, less complex switching networks.

17 Claims, 6 Drawing Sheets

U.S. PATENT DOCUMENTS

| | | | |
|---|---|---|---|
| 4,706,239 | 11/1987 | Ito et al. | |
| 4,813,036 | 3/1989 | Whitehead | 370/325 |
| 4,858,225 | 8/1989 | de Santis | 370/323 |
| 4,858,229 | 8/1989 | Rosen et al. | 370/325 |
| 4,868,886 | 9/1989 | Assal et al. | 455/13.3 |
| 5,033,108 | 7/1991 | Lockwood | 455/13.2 |
| 5,068,813 | 11/1991 | Thoen | 364/572 |
| 5,129,095 | 7/1992 | Davis et al. | 455/12.1 |
| 5,233,609 | 8/1993 | Hunton | 370/497 |
| 5,274,627 | 12/1993 | De Santis | 370/307 |
| 5,274,840 | 12/1993 | Schwendeman | 455/13.1 |
| 5,303,286 | 4/1994 | Weideman | 455/428 |
| 5,343,512 | 8/1994 | Wang et al. | 455/410 |
| 5,355,512 | 10/1994 | Profera, Jr. | 455/13.3 |
| 5,394,560 | 2/1995 | Krane | 455/12.1 |
| 5,396,643 | 3/1995 | Frenzer et al. | 455/13.1 |
| 5,408,515 | 4/1995 | Bhagat et al. | 455/431 |
| 5,428,814 | 6/1995 | Mort et al. | 455/12.1 |
| 5,432,780 | 7/1995 | Smith et al. | 370/297 |
| 5,555,257 | 9/1996 | Dent | 370/319 |
| 5,563,892 | 10/1996 | Kostreski et al. | 370/487 |

REPEATERS FOR MULTIBEAM SATELLITES

BACKGROUND OF THE INVENTION

This invention relates to switching networks associated with multibeam communications satellite repeaters. Prior art multibeam satellite repeaters employed input demultiplexers for dividing incoming beams into a number of transponder channels. Prior to high-power amplification, these channels were interbeam switched by means of coaxial switches so that communications intelligence arriving at the satellite via one of the incoming beams could be directed to one of several output beams. These connections were made on a relatively broad channel basis, i.e. all of the information in one transponder channel had to be switched as a packet onto the outgoing channel.

Recently, a number of important developments have occurred in the mobile communications markets. For the hand-held-terminal market, interest is now focused on low-earth-orbit (LEO) and medium-earth-orbit (MEO) satellite constellations. The fixed (geostationary or GEO) market is also undergoing major changes. Traditional point-to-point communications between major population centers are being converted to optical fiber and operators are now looking to provide a far greater number of narrowbandwidth links, principally to areas that are not well served by existing terrestrial infrastructure. To this end, recently proposed satellites have more beams, higher effective isotropic radiated power (EIRP) and greater interbeam connectivity so that users will require less expensive ground terminals. These trends are being accelerated by data compression which is forcing operators to lease comparatively narrow bandwidths.

The mounting demand for greater connectivity and leases of fractions of transponders cannot be satisfied by simply increasing the number of beams since this aggravates the connectivity problem and leads to reduced transponder utilization efficiency.

The problem of interconnecting narrowbandwidth links was addressed by Ito et al. in U.S. Pat. No. 4,706,239 issued Nov. 12, 1987 and assigned to Kokusai Denshin Denwa Co. Ltd. In the Ito et al patent, each incoming radio-frequency beam is divided first into transponder channels by means of a demultiplexer as is well known in the art. Each channel is then downconverted to an intermediate frequency and further divided into subchannels by use of surface-acoustic-wave (SAW) filters. Interbeam switching is then carried out using GaAs FET switches at the relatively narrow subchannel level, rather than at the channel level as in prior systems. The output of the switches are subsequently multiplexed back into transponder channels, and upconverted to radio-frequency for amplification and multiplexing into output beams.

The Ito et al. development allows for significant improvements in satellite use by enabling greater transponder efficiency while reacting to the demand for switching of narrower bandwidth information packets. In addition, the Ito et al. improvement permits the uplinked input information at the subchannel bandwidth level to be simultaneously connected to a number of output beams, thereby permitting narrowband information broadcasting to several reception points.

There are certain conditions that must be satisfied for this form of subchannelization to be useful. First, the satellite must have multiple beams: in a system with one uplink and one downlink all traffic would have a single source and a single destination and independently switched subchannels would produce no benefit. Second, the operator must lease fractional transponders.

If these conditions are satisfied, then, in general, there will be links on the satellite with requirements for a fraction of a transponder. For example, the traffic volume from an uplink to a downlink might occupy 2.2 transponders. In this case, a system without subchannelization would require three full transponders to serve only 2.2 transponders worth of traffic. The purpose of the subchannelization is to manage the fractional part of the traffic, 0.2 of a transponder in this example, in the various links. A single subchannel could then be used for this fractional part of the traffic, leaving the other subchannels free for use in other links. The integral part of the traffic, 2 transponders in this example, could use ordinary transponder channels without loss of efficiency.

If surplus transponders are available, then partially occupied transponders are not a problem. However, the number of transponders is limited by several considerations such as cost, internationally agreed spectrum allocations, and the available power on the satellite bus. Multibeam satellites are generally power-limited. In the current state of the art, an 8-beam satellite would typically support 4 transponders per beam, though this may increase to 8 transponders per beam in the foreseeable future with the introduction of very-high-power buses. In such multibeam systems, a substantial proportion of the transponders would be partially occupied. Subchannelization allows more efficient operation of the satellite without increasing the total number of transponders. The actual capacity increase produced by subchannelization is dependent on system configuration and traffic patterns, but is typically 25%.

The major disadvantages of the Ito et al. system are the increases in the cost, mass and power budgets of the satellite to support the subchannelization of each transponder channel. The additional hardware increases, the initial system cost, and the increase in mass and power consumption (leading to an increase in power-supply hardware) must be compensated by a reduced fuel load, which in turn reduces satellite lifetime and hence long-term revenue. These factors would significantly offset the advantages of the 25% efficiency improvement gained by using the Ito method to subchannelize each of the transponder channels, and hence this method has proven to be unsatisfactory.

In the Ito et al. system, for an 8-beam, 8-channel satellite, 8 processors would be employed, each providing full 8-beam connectivity at the subchannel level. This would require substantial hardware and, consequently, would cause a substantial power drain on the satellite power bus, would increase the total mass of the satellite, and would cause an increase in the cost of both the satellite and the launch. In addition, the present inventors have conducted traffic-pattern studies which indicate that the Ito et al. full subchannelization method would not provide significantly superior performance to a satellite system with only a portion of the transponder channels subchannelized. The reason for this result is that subchannelization is useful only for managing the fractional portion of the overall satellite traffic pattern. For example, if a certain user of the satellite required the bandwidth of an entire transponder channel for its information, then subchannelization of that channel is a waste of system resources. It is therefore only worthwhile to subchannelize sufficient channels to accommodate the fractional traffic in the various links: the integral traffic volumes can then be handled by conventional transponders and switch matrices. Such an arrangement minimizes the impact of the processors on the cost, mass and power budgets, while preserving most of the benefit. In addition, further reviews indicate that a full 8-by-8 connectivity for each processor would give only marginally better performance than suitably configured 4-by-4 processors.

SUMMARY OF THE INVENTION

The inventors have discovered that, by combining the coaxial switch methods with the subchannelization methods taught by Ito et al., similar advantages to those of the Ito et al. system can be obtained with greatly reduced hardware complexity, and with greatly diminished power requirements, hardware and launch costs and satellite mass. For example, the traffic pattern studies conducted by the present inventors have indicated that in the 8-beam, 8-channel system considered above, subchannelizing 4 channels would typically produce a 20% capacity improvement, while subchannelizing all 8, as proposed by Ito et al., would produce only a 25 % improvement. The marginal gains that can be made by going from 4 to 8 subchannelized channels do not justify the associated doubling or, possibly, quadrupling in the amount of processor hardware. The major disadvantages of the Ito et al. full subchannelizing system lies in the increase in cost, power, weight and volume budgets for a satellite. The added cost of building, launching and operating the more complex Ito et al. satellite offsets the increase in customer revenues due to the marginally more efficient use of the satellite.

The present invention combines the coaxial switching methods with the subchannelization method taught by Ito et al., wherein only a portion of the transponder channels are subchannelized, the remainder of the channels being switched using the coaxial switching method, thus enabling the commissioning of relatively inexpensive subchannelizing systems that offer more efficient transponder utilization than standard coaxial switching systems, and do so at much lower cost, weight, and power consumption than the full subchannelized system of Ito et al. The present invention thus offers new commercial opportunities hitherto not realizable. For example, service to remote communities becomes more attractive. These services would include telephone services as well as, possibly, some form of cellular service such as described in U.S. Pat. No. 5,081,703 by Lee et al, issued on 9 Jan. 1992 and assigned to PACTEL CORPORATION.

BRIEF DESCRIPTION OF THE DRAWINGS In the drawings.

Figure 1:
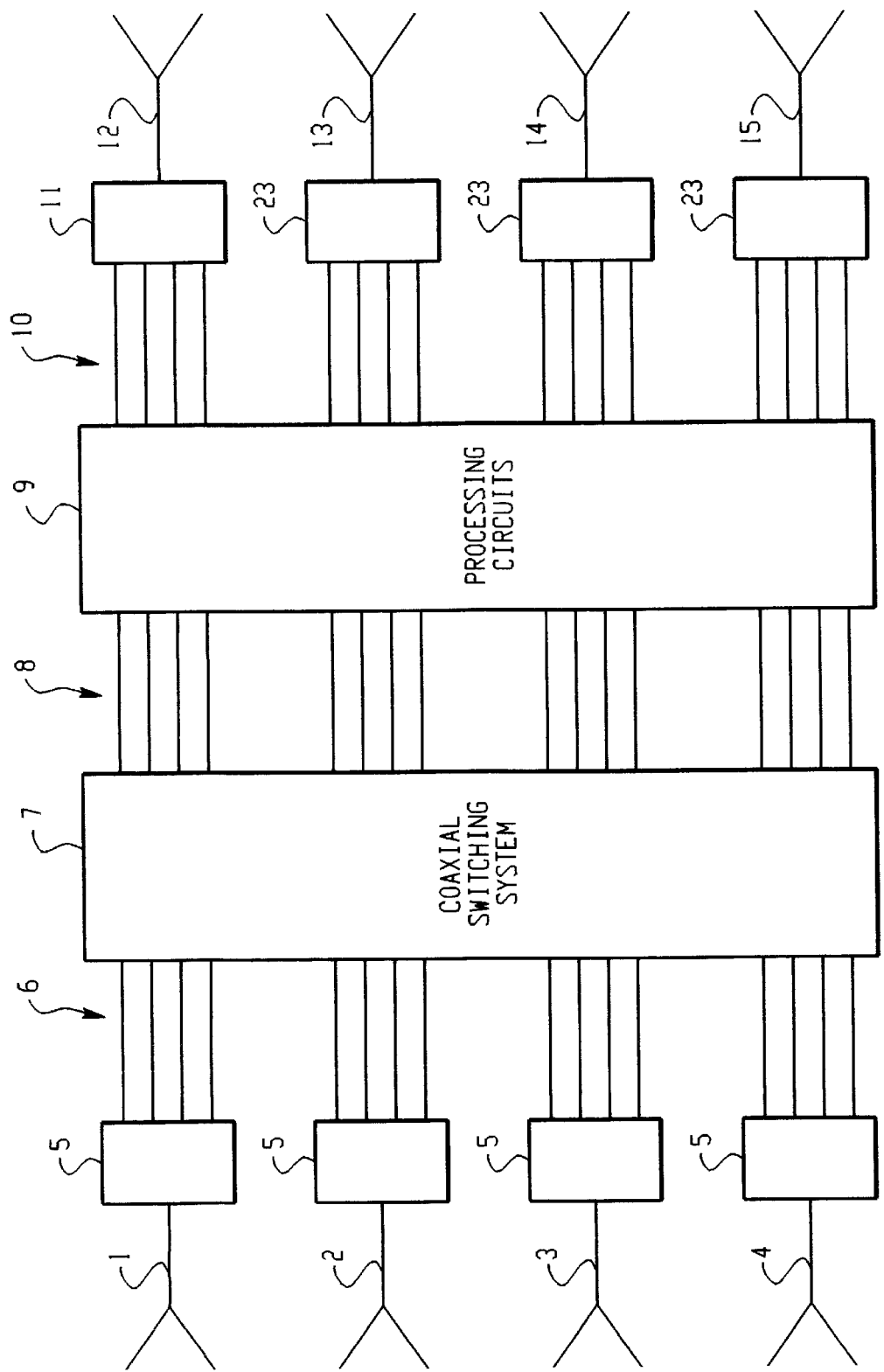
FIG. 1 shows the prior art that utilizes coaxial switching to accomplish interbeam switching at the transponder channel level.

Not shown in the drawings or discussed to any extent in the description are the standard circuit components found in a satellite repeater system. These include the low-noise amplifiers, the frequency down-converters (e.g. from 14 GHz to 12 GHz) and the redundancy selection circuits. Such additional circuitry is well known in the art of satellite repeater systems.

DETAILED DESCRIPTION OF PREFERRED EMBODIMENTS

Referring to FIG. 1, consideration is given to a prior art 4-beam satellite in which each beam is divided into 4 channels. Input beams 1 to 4 are fed to the input demultiplexers 5 and the resulting sixteen channels (generally shown at 6) are connected to a coaxial switching network 7 to provide for interbeam connections. The reconstituted 16 channels (generally shown at 8) are fed through further processing equipment (e.g. amplifiers) shown at 9 for connection via path (generally shown at 10) to the output multiplexers 11 and for further connection to the beam outputs shown at 12 to 15. This prior art system provides channel switching of the incoming beams to the outgoing beams, but does not provide any type of subchannelization of the transponder channels.

Figure 2:
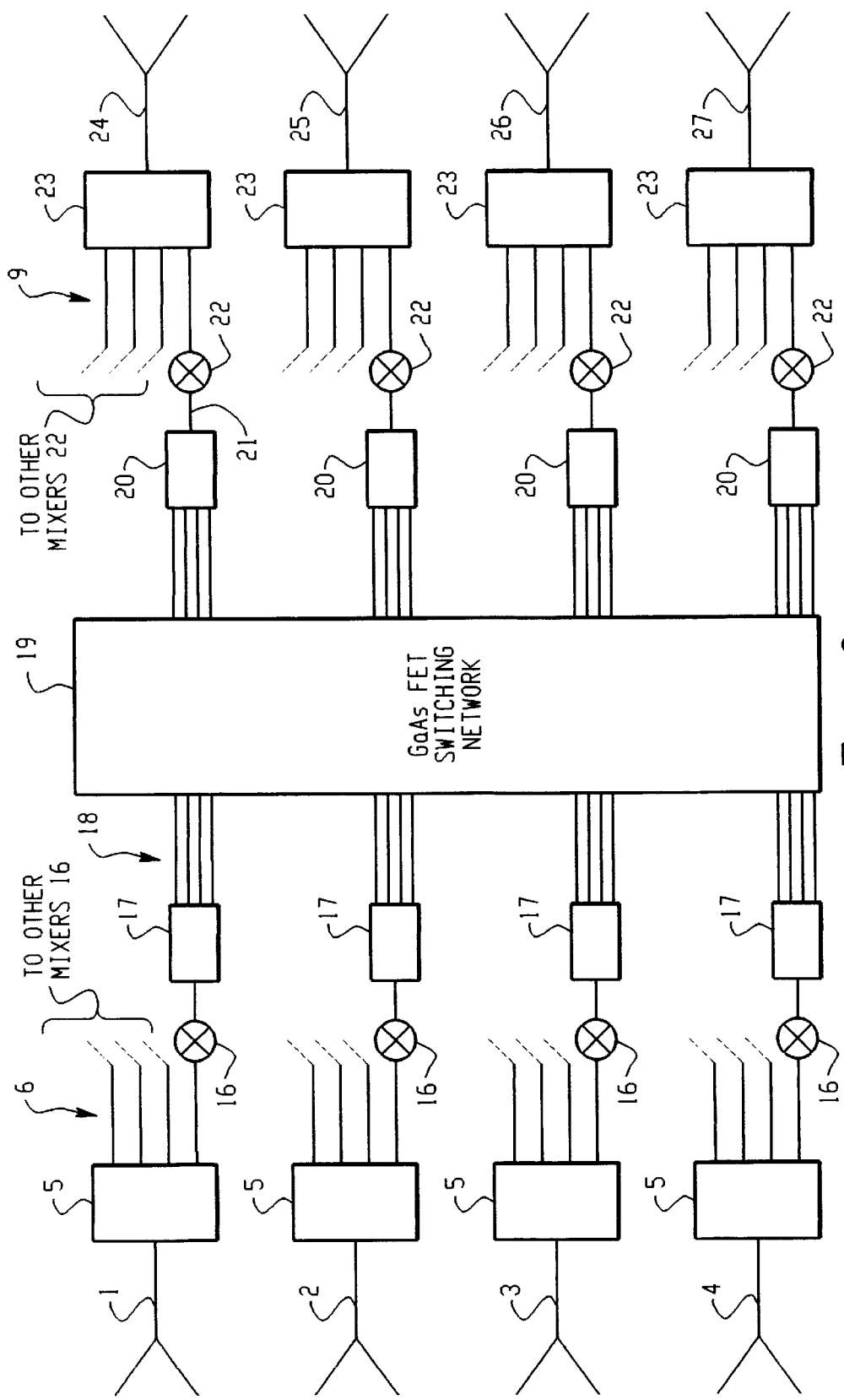
FIG. 2 shows the prior art improvement as described in the Ito et al. patent.

Referring to FIG. 2, the prior art system of Ito et al. teaches that, for the 4-by-4 satellite described above, input beams 1 to 4 are also connected to the input demultiplexers 5 and split into sixteen channels 6. All of the channels (only one channel from each beam is shown in FIG. 2 for simplicity) are downconverted via mixers shown at 16 to an intermediate frequency. After subchannelizing in the SAW filter networks 17, the subchannels are then passed (generally shown at 18) to the GaAs FET switching network 19 for interbeam connection at the subchannel level. The newly reconstituted subchannels are combined in circuits 20 to form new channels 21. These channels are upconverted via mixers 22 and fed to the high-power amplifiers and output multiplexer, shown lumped together as block 23, for onward transmission to the 4 output beam feeds shown as 24 to 27. The connectivity is the same as shown in FIG. 1, but it is now provided at the subchannel, rather than at the channel, level. In the Ito et al. prior art method each of the transponder channels are likewise subchannelized and each of the subchannels is then switched using the GaAs FET switching network. There is no teaching or disclosure by the Ito et al. method of only partially subchannelizing the transponder channels, or of combining the subchannelization technique with the prior art coaxial switching technique on some portion of the transponder channels.

Figure 3A:
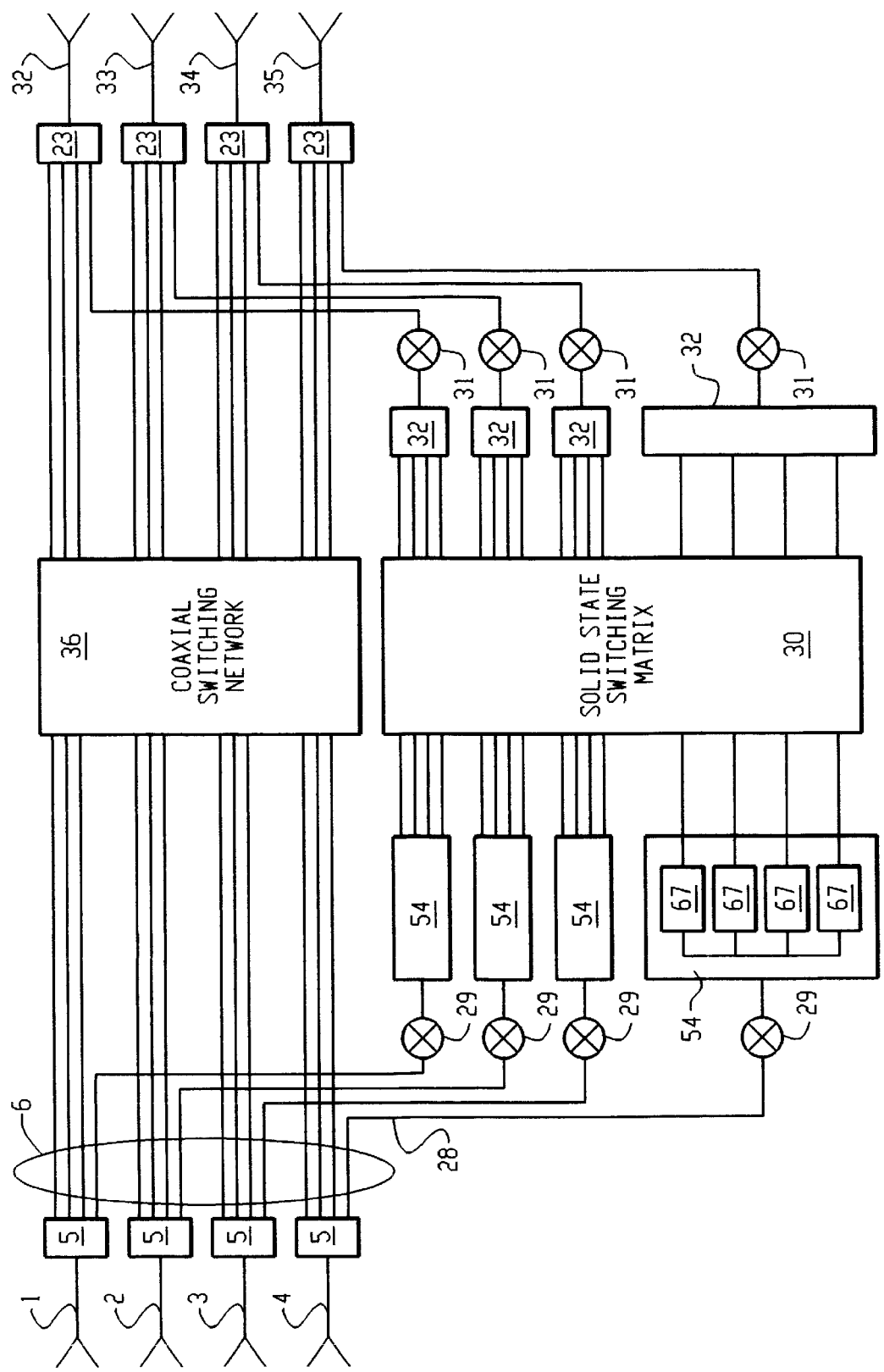
FIG. 3A shows a first embodiment of the present invention.

Referring now to FIG. 3A in the drawings, in one embodiment of the present invention, radio-frequency signals comprising each of the four incoming beams shown as 1 to 4 respectively, and arriving at the inputs are each separated by waveguide-cavity demultiplexers 5 into 4 channels generally shown at 6. (The beams could come from terrestrial sources or, in the case of intersatellite links, from another satellite). Usually, the information on each of these derived channels is packaged so that it could be usefully further divided into subchannels. (See Ito et al.) For example, the incoming beams could be 14 GHz in frequency and channels 54 MHz in bandwidth could be generated. One channel of each demultiplexed beam is selected (shown at 28), down-converted via mixers 29 to a lower frequency (e.g. an intermediate frequency of 350 MHz) and fed to the input of a filter bank 54 of SAW filters 67, as described in Ito et al., to form subchannels. In this embodiment, two subchannels are 18 MHz in bandwidth and two are 9 MHz in bandwidth. These subchannels are interbeam switched using solid state switches in switching matrix 30: for example, Ito et al, use GaAs FET switches. The reconstituted subchannels are recombined in 32, upconverted through mixers 31 to an appropriate radio frequency such as 12 GHz and form one channel each feeding amplifiers and other appropriate processing or conditioning circuitry (not shown in the drawings). These subchannelized channels are finally fed to the input of the high-power amplifiers and output multiplexers (shown as lumped together in blocks 23) and as taught in Ito et al. The reconfigured beams, 32 to 35, comprise the output signals.

The remaining channels that were not selected for subchannelization by feeding to the filter bank are connected into the standard coaxial switching system and processed, interbeam switched and amplified. This technology is well known in the art and is generally depicted by the block 36 (refer also to FIG. 1). The output of block 36 is frequency translated to 12 GHz (generally this happens prior to demultiplexing in 5) and connected in known fashion to the high-power amplifier and output multiplexer 23, in parallel with the previously described subchannelized channels from the mixers 31. In this fashion, a satellite repeater is provided which combines transponder efficiency gains similar to the full subchannelization technique with the power, cost, and weight savings properties of the standard coaxial switching system.

Figure 3B:
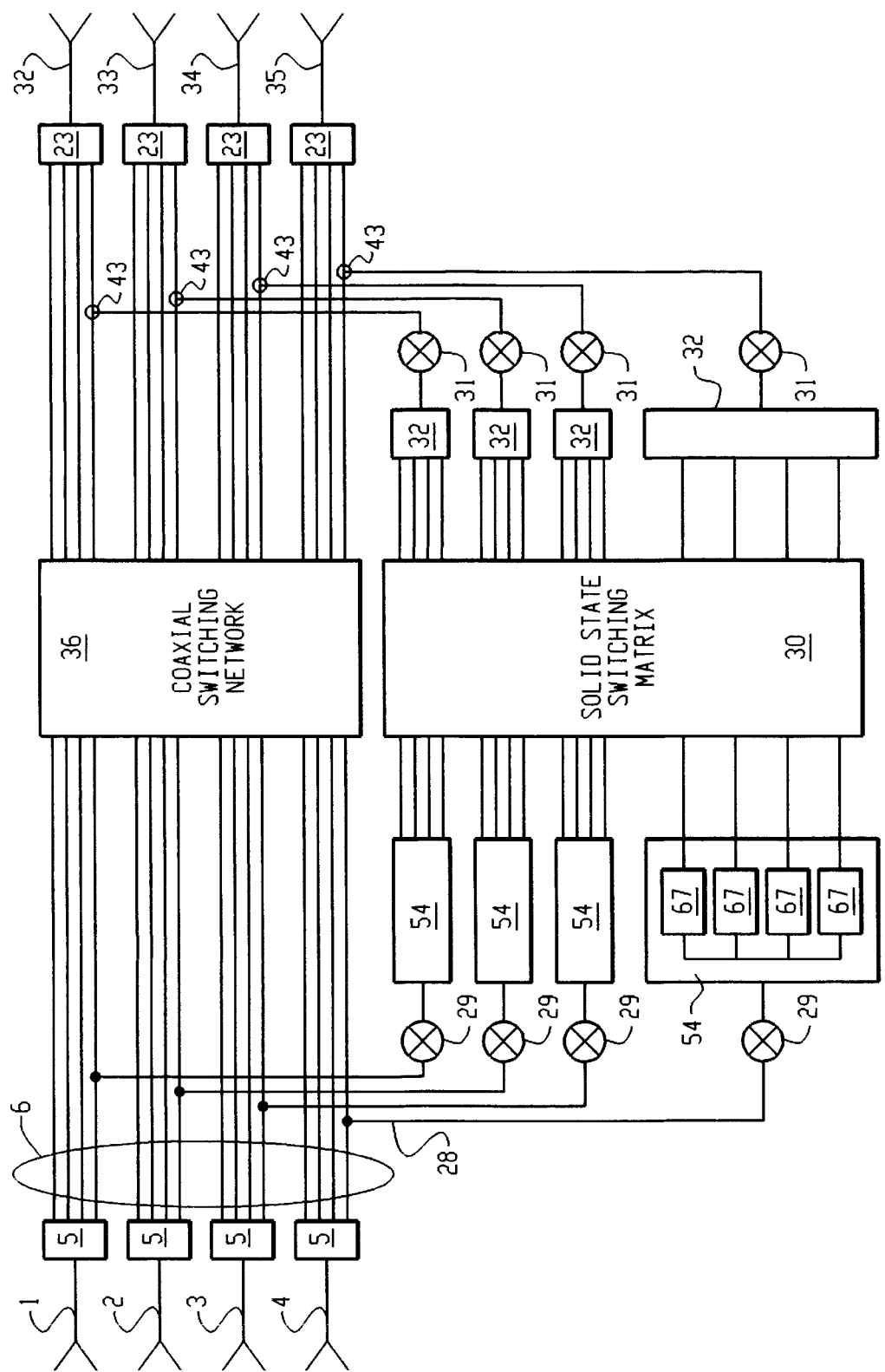
FIG. 3B shows an alternative first embodiment of the present invention with a redundant parallel architecture.

Referring now to FIG. 3B of the drawings, an alternative embodiment of the present invention is set forth which is similar to the embodiment of FIG. 3A, but which adds a degree of parallelism and fault tolerance to the repeater. In this alternative embodiment, instead of only feeding the non-subchannelized channels into the standard coaxial switching network 36, as set forth in FIG. 3A, all of the channels 6, including those fed into the subchannelization network 28 are fed into the standard coaxial switching network 36. In order to accommodate the redundant channels that are both channel-switched by the coaxial network 36, and subchannelized and switched by the subchannel network 30, a plurality of switches 43 are interposed between the outputs of the two switching networks and the inputs of the multiplexers in a fashion similar to that disclosed below in connection with FIG. 4. This architecture provides for a degree of parallelism and fault tolerance in the repeater that is not part of the prior art. For example, if one of the SAW filter banks 54 of the repeater failed, that particular channel would still be useful for channel switched information by positioning the switch 43 to select from the output of the coaxial switching network 36. Alternatively, if the coaxial switching network failed, those channels that are routed through the subchannel switching network would still be capable of use by positioning the switches 43 to select from the outputs of the subchannel network. This redundant system is more robust than a single switching network system as taught by the prior art, in that both the coaxial switching network and the subchannelizing switching network have to fail in order for the repeater to be wholly inoperative.

Figure 4:
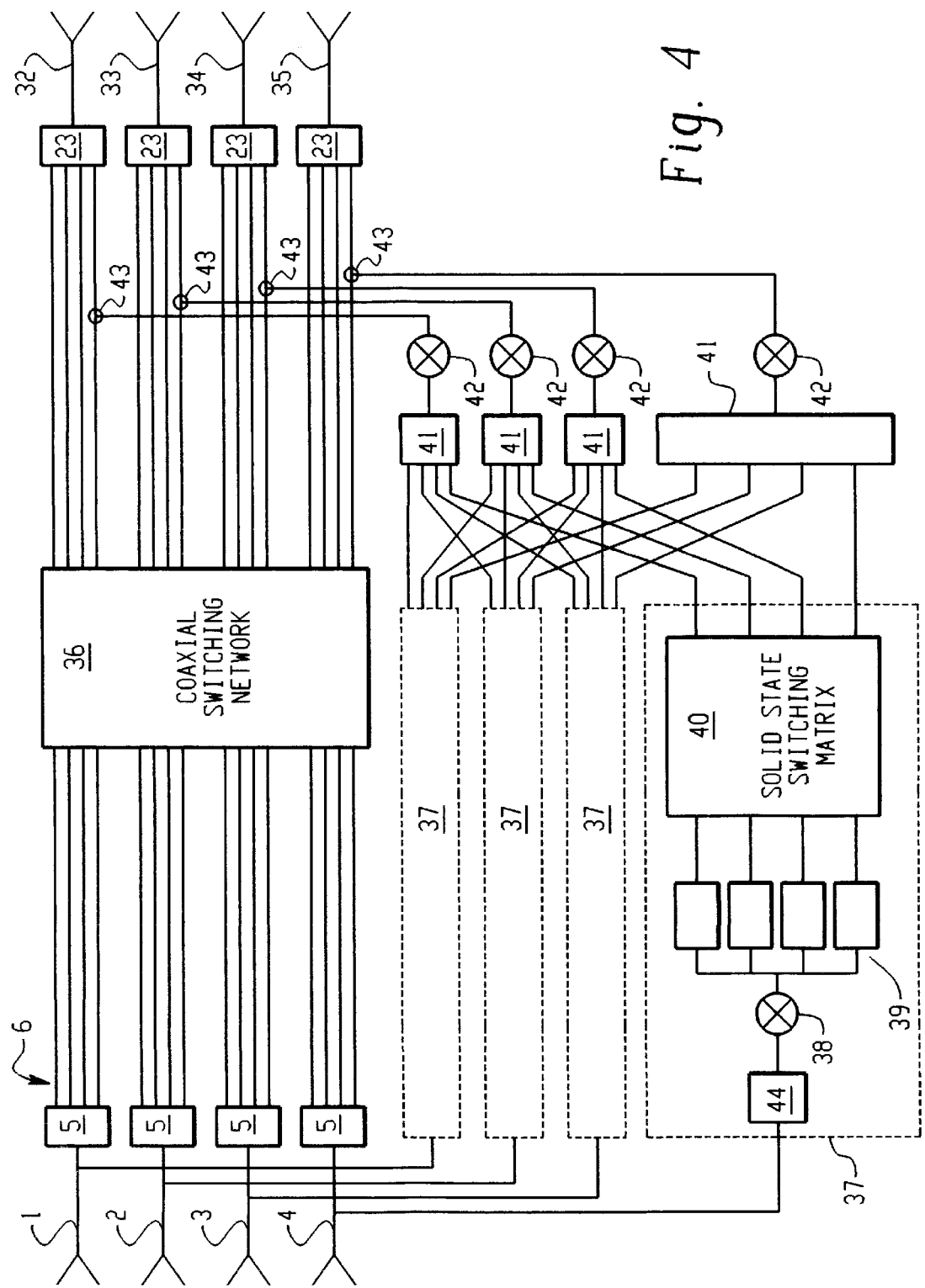
FIG. 4 shows a second embodiment of the present invention in which part of the input demultiplexer is bypassed.

In another embodiment of the present invention shown in FIG. 4, the incoming radio-frequency signals are fed in parallel to the input demultiplexers and to the inputs of four novel processors 37. (To avoid confusion in the understanding, only one processor 37 is shown in detail and the following will describe the operation of just one processor 37). The radio-frequency signal passes through band-limiting, noise-reducing filter 44, which uses resonators of low selectivity (when compared to the selectivity of waveguide cavity resonators in standard input demultiplexers). The purpose of filter 44 is to suppress out-of-band signals such that noise due to intermodulation and other effects are within acceptable limits for signal traffic. The signal is fed from filter 44 to mixer 38 for downconversion to a lower frequency (e.g. an intermediate frequency of 350 MHz). The resulting channel signal is then fed through a bank of SAW filters shown at 39 for subchannelization. The high selectivity of the SAW filters serve to provide fine selection of the signals corresponding to one channel only. One could choose, therefore, to design input demultiplexers that drop the channels that are treated in the SAW filter processor. However, as will be explained below, it is preferred to pass all channels through the standard coaxial switching system for reasons of redundancy. If filter 44 is of micro-stripline construction, it can be readily integrated into the printed-circuit-board design. The filtered signals representing one channel are then connected to solid-state (e.g. GaAs FET) switching matrices 40 and treated from there on as described above, i.e. combined in a known way in circuits shown at 41 and subsequently upconverted in mixers shown at 42. In parallel with the subchannelizing activity, radio-frequency signals are fed to the input demultiplexers which separate the channels. The outputs of the input demultiplexers are sent for coaxial switching in 36 as described before. The beam-switched channels from 36 are connected to high-power amplifiers and the output multiplexers as well known in the art and generally shown in blocks 23.

An added feature of this embodiment is that the newly formed subchannelized channels are connected by way of single-pole, double-throw switches 43 to appropriate output channels prior to amplification in high-power amplifiers feeding the output multiplexers. These switches are used to connect selectively either the outputs from the coaxial switching matrix or the outputs from the combining circuits 41 and mixers 42 to the amplifier/multiplexer 23. In this example, the channels sent for subchannelizing are also separated out in the input demultiplexer and fed to the coaxial switches. This arrangement allows for a degree of redundancy by providing choice of paths, i.e. if, for example, the processors 37 fail, alternate connection paths are available through the coaxial switches. Note that not all switches 43 need be thrown in the same position so that there may be various combinations of connections achieved, i.e. not all of the processors 37 need be in operational use at any one time.

Figure 5:
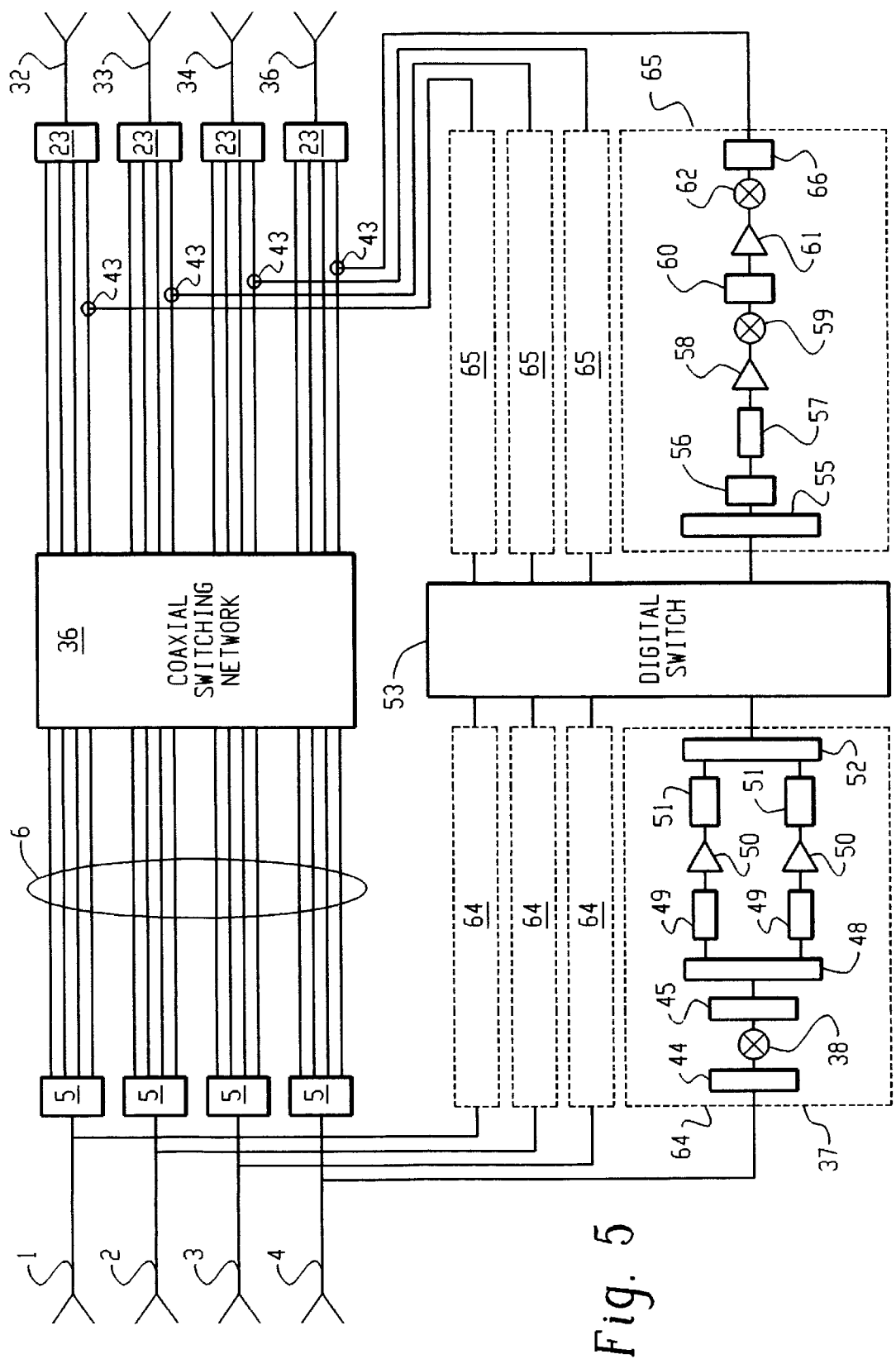
FIG. 5 shows a third embodiment of the present invention in which digital techniques are used.

Now turning to FIG. 5, in another embodiment of the present invention, a digital processor is used to subchannelize and route a set of transponder channels between beams. FIG. 5 shows the digital processor with inputs from 4 beams. The various sections will be described with reference to FIG. 5.

The channels for digital subchannelization can be selected either before or after the input demultiplexers as described with respect to FIGS. 3 and 4 above. The following describes an embodiment in which connection is made prior to the input demultiplexers 5. An arrangement such as described in FIG. 4 above is used. The radio-frequency signals pass through filters 44, such as described above with reference to FIG. 4, and are downconverted in mixers 38 from radio frequency to a lower frequency, i.e. an intermediate frequency such as 350 MHz as described with reference to FIG. 4.

FIG. 5 illustrates that a double downconversion occurs, first via the mixer 38, and then by the Quadrature downconverter 48. The dotted outline (block 64) is shown in detail only once. Within the block 64, after filtering of the intermediate frequency in 45, the signal is downconverted to baseband in quadrature downconverter 48 in order to reduce the required sampling rate. It is also possible to use a real downconversion with conversion to complex baseband performed digitally if the analog-to-digital converter has sufficient bandwidth and sampling rate. Note that the reverse of this process occurs in the upconversion chain (shown in dotted outline as block 65 and in detail only once). Lowpass filtering and amplification are supplied by filter 49 and amplifier 50 respectively so that devices operate in their optimal range. An anti-aliasing filter is required before digitizing the signal. This can be applied by either bandpass filters 45 before the final downconversion stage (for example with surface-acoustic-wave devices) or by lowpass filters 49 after the final downconversion stage 48.

The signals are converted to digital form in analog-to-digital converters 51. They feed into the inputs of digital demultiplexers 52 which take these frequency-multiplexed input signals and pass time-multiplexed signals to the input ports of digital switch 53. Demultiplexing in 52 can be performed by any number of well-known algorithms such as poly-phase Fast Fourier Transform (FFT) or multistage filtering. The exact selection will depend upon the overall bandwidth and the number of subchannels. As is possible with SAW-based filtering, subchannel filtering can be performed in such a manner that if two contiguous subchannels are switched to the same output beam, the full bandwidth of both subchannels is available with no guardband between them.

The digital switch 53 routes the inputs to different outputs according to a mapping that varies according to the time slot (i.e. subchannel). This mapping can be updated to vary connectivity. The outputs go to the digital multiplexers 55.

The multiplexers 55 perform the exact inverse of processing in the demultiplexers, hence the same algorithms can be used. The time-division multiplex signal is converted to a frequency division multiplex signal at the output of the multiplexer. The digital signal is converted to analog form by a digital-to-analog converter 56 followed by a lowpass filter 57. A real upconversion in mixer 59 is illustrated but a complex upconversion can be performed if it is necessary to reduce the requirement on the digital-to-analog converter. Gain is applied by amplifier 58 as required to ensure the various devices operate at their optimum range and to ensure output signals are at the correct signal levels. After further filtering in 60 and amplification (61), the output of the upconversion (mixer 62) is filtered by bandpass filter 66 and then goes to either a conventional switch (switching points 43 as described with reference to FIG. 4 are shown as one option) or a high-power amplifier, such as a travelling-wave-tube amplifier.

In the embodiments of the present invention exemplified by FIGS. 3 and 4, the processor is a SAW-based electronics subsystem whose function is to subchannelize 54 MHz transponders into two 9 MHz and two 18 MHz subchannels. Under operator control, the 16 subchannels are recombined, via solid-state switches, in any combination of subchannels to form four new 54 MHz channels, now containing interbeam exchanged information. However, each individual subchannel can be selected arbitrarily from any of the input beams.

Normally, a subchannel on an input beam will be routed to only one output beam but in broadcast mode (see the teaching of Ito et al.) a single subchannel or group of subchannels may be routed to multiple outputs and subchannels may be recombined such that all subchannels that make up each new 54 MHz channel have the same downlink (beam) destination. The four 54 MHz channels are then output from the processor and switched into the standard repeater path for downlinking.

In the specification, various embodiments have been shown and examples have been given. Modifications can be made without departing from the spirit of the invention. For example, bandwidths of the channels may not be equal to each other and may be more or less than 54 MHz. Also, more or fewer than four subchannels could be generated, and these could be of bandwidths to suit specific traffic requirements. Means could be included in the design (e.g. in the subchannels) to ensure approximate equalization of output power levels. Four or eight beams are given as examples: these are examples only and the invention should not be limited to those numbers of beams.

Reference has been made to the use of coaxial switching matrices. It would be recognized by those skilled in the art that other forms of electro-mechanical radio-frequency switches may be used. For example, waveguide switches may be substituted, especially where high radio frequencies, e.g. Ka-Band and higher, are to be used.

The embodiments of the invention in which an exclusive property or privilege is claimed are defined as follows:

What is claimed:

1. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams, wherein each said means for selecting and for dividing is connected to an output of an input demultiplexer and includes a frequency downconverter in series with a bank of surface-acoustic-wave filters;

second means for interbeam switching the subchannels produced by dividing the selected channels;

means for combining the interbeam-switched subchannels into a set of interbeam-switched subchannelized channels; and means for connecting the interbeam-switched channels and the interbeam-switched subchannelized channels to the inputs of the output multiplexers.

2. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams, wherein each said means for selecting and for dividing is connected to an input of an input demultiplexer and includes, in series, a band-limiting filter, a frequency downconverter and a bank of surface-acoustic-wave filters;

second means for interbeam switching the subchannels produced by dividing the selected channels;

means for combining the interbeam-switched subchannels into a set of interbeam-switched subchannelized channels; and means for connecting the interbeam-switched channels and the interbeam-switched subchannelized channels to the inputs of the output multiplexers.

3. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams, wherein each said means for selecting and dividing is connected to an input of an input demultiplexer and includes means for converting each selected channel to a digital format and digital multiplexer means to divide the converted selected channels into subchannels;

second means for interbeam switching the subchannels produced by dividing the selected channels;

means for combining the interbeam-switched subchannels into a set of interbeam-switched subchannelized channels; and means for connecting the interbeam-switched channels and the interbeam-switched subchannelized channels to the inputs of the output multiplexers.

4. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams;

second means for interbeam switching the subchannels produced by dividing the selected channel, wherein said second means for interbeam switching comprises a solid-state switching network;

means for combining the interbeam-switched subchannels into a set of interbeam-switched subchannelized channels; and means for connecting the interbeam-switched channels and the interbeam-switched subchannelized channels to the inputs of the output multiplexers.

5. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams;

second means for interbeam switching the subchannels produced by dividing the selected channels, wherein said second means for interbeam switching comprises a matrix of GaAs FET devices;

means for combining the interbeam-switched subchannels into a set of interbeam-switched subchannelized channels; and means for connecting the interbeam-switched channels and the interbeam-switched subchannelized channels to the inputs of the output multiplexers.

6. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams wherein the improvement comprises the combination of:

first means for interbeam switching a plurality of the channels produced at the output of said input demultiplexers, thereby creating a set of interbeam-switched channels;

means for selecting and for dividing into subchannels at least one channel from each of at least two of the incoming beams;

second means for interbeam switching the subchannels produced by dividing the selected channels;

means for combining the interbeam-switched subchannels into a set of interbeam-switched subchannelized channels; and means for connecting the interbeam-switched channels and interbeam-switched subchannelized channels to the inputs of the output multiplexers, wherein said means for connecting includes a switch for selectively connecting either an interbeam-switched channel or an interbeam-switched subchannelized channel, to the input of an output multiplexer.

7. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams, wherein the improvement comprises the combination of:

a coaxial switching matrix connected to the outputs of said input demultiplexers for interbeam switching, at radio frequency, channels produced at the output of said input demultiplexers, thereby to create a set of interbeam-switched channels;

frequency downconversion circuits connected to the input demultiplexers, each of said downconversion circuits downconverting the channels associated with an input beam to an intermediate frequency;

a bank of surface-acoustic-wave filters connected to the output of each frequency downconversion circuit to divide, at an intermediate frequency, the channel into frequency-spaced subchannels;

a solid-state matrix connected to the outputs of the banks of filters for interbeam switching the subchannels produced by the filter banks;

a solid-state network for combining the interbeam-switched subchannels into a set of interbeam-switched subchannelized channels;

frequency upconversion circuits connected to the outputs of the solid-state network to convert the set of interbeam-switched subchannelized channels to radio frequency; and connection circuitry, including amplifiers and filtering circuits, to connect the interbeam-switched channels and the interbeam-switched subchannelized channels to the inputs to the output multiplexers.

8. The communications repeater according to claim 7, wherein each frequency downconversion circuit is connected to at least one output of each of at least two input demultiplexers, said frequency downconversion circuits downconverting the demultiplexed channels to an intermediate frequency.

9. The communications repeater according to claim 7, wherein each frequency downconversion circuit is connected, through band-limiting filters, to the input of at least two input demultiplexers, said frequency downconversion circuits each downconverting signals representing a channel to an intermediate frequency.

10. A communications repeater for a multibeam satellite in which a satellite radio-frequency communications band for each beam is comprised of a plurality of associated channels, each channel containing intelligence separable into distinct subchannels, said satellite repeater having an input demultiplexer for each incoming beam for dividing beams into channels and an output multiplexer for each outgoing beam for combining channels into beams, wherein the improvement comprises the combination of:

a coaxial switching matrix connected to the outputs of said input demultiplexers for interbeam switching, at radio frequency, said channels produced at the output of said input demultiplexers, thereby to create a set of interbeam-switched channels;

frequency downconverting circuits connected, through band-limiting filters, to the inputs of at least two input demultiplexers, said circuits downconverting the signals at the outputs of said band-limiting filters to an intermediate frequency, the down-converted signals representing at least two selected channels;

a bandpass filter connected to the output of each frequency downconverting circuit and each connected to the input of a quadrature downconverter;

each said quadrature downconverter connected to the output of the bandpass filter to convert the selected channel to baseband;

first lowpass filters connected to the outputs of each quadrature downconverter;

analog-to-digital converters for receiving the output signals from the first lowpass filters for converting the baseband signal to digital format;

digital demultiplexers connected to the outputs of the analog-to-digital converters to divide the digital signals into subchannels, each subchannel being represented by a time slot;

a digital switch connected to the outputs of the digital demultiplexers for routing the subchannels in their time slots to digital multiplexing circuits, said digital multiplexing circuits serving to combine the subchannels into a set of interbeam-switched subchannelized channels;

digital-to-analog converters connected to the outputs of the digital multiplexing circuits for converting the interbeam-switched subchannelized channels to analog format;

second lowpass filters connected to the output of said digital-to-analog converters for smoothing the digital-to-analog output signal and filtering of upper-frequency images;

upconverting circuits for converting the outputs of the second lowpass filters to radio frequency;

connecting circuitry, including amplifiers and filtering circuits, to connect the interbeam-switched channels and the interbeam-switched subchannelized channels to the inputs to the output multiplexers.

11. The communications repeater of claim 10 in which the bandpass filter is an anti-aliasing filter to restrict the signals at its output to those of one of the selected channels only.

12. The communications repeater of claim 10 in which the lowpass filter is an anti-aliasing filter to restrict the signals at its output to those of one of the selected channels only.

13. A communications repeater for use with a multibeam satellite, said repeater comprising:

a plurality of input demultiplexers, wherein each input demultiplexer is connected to an input beam, and wherein each input demultiplexer separates the input beam into a plurality of channels;

a coaxial switching network connected to some, but not all, of the plurality of channels, wherein said coaxial switching network switches the connected channels to form a set of interbeam-switched channels;

a subchannelizing and solid state switching circuit connected to the plurality of channels which are not connected to the coaxial switching network, wherein the circuit separates the connected channels into subchannels, switches the subchannels, and forms a set of interbeam-switched subchannelized channels;

a plurality of output demultiplexers, wherein each output demultiplexer is connected to at least one of the interbeam-switched channels and at least one of the interbeam-switched subchannelized channels, and wherein the output of each output demultiplexer forms an output beam.

14. The satellite repeater according to claim 13, wherein the subchannelizing and solid state switching circuit includes a plurality of downconversion mixers and banks of surface-acoustic-wave filters that separate each connected channel into subchannels.

15. The satellite repeater according to claim 14, wherein the subchannelizing and solid state switching circuit includes a FET switching network connected to the banks of surface-acoustic-wave filters, wherein the FET switching network switches the subchannels onto its outputs.

16. The satellite repeater according to claim 15, wherein the subchannelizing and solid state switching circuit includes a plurality of recombining and upconversion circuits, wherein each recombining and upconversion circuit is connected to a plurality of outputs from the FET switching network, and wherein the outputs from the plurality of recombining and upconversion circuits forms the set of interbeam-switched subchannelized channels.

17. A communications repeater for use with a multibeam satellite, said repeater comprising:

- a plurality of input demultiplexers, wherein each input demultiplexer is connected to an input beam, and wherein each input demultiplexer separates the input beam into a plurality of channels;
- a coaxial switching network connected to the plurality of channels, wherein the coaxial switching network switches the channels to form a set of interbeam-switched channels;
- a filtering, subchannelizing and solid state switching processor connected to at least one of the input beams, wherein said processor includes narrow bandpass filters that filter the input beam into a representative channel, wherein said processor further includes separation circuitry that separates the filtered channel into subchannels, and wherein said processor further includes subchannel switches that switch the separated subchannels to form a set of interbeam-switched subchannelized channels;
- a plurality of channel switches, wherein each of said channel switches is connected to at least one interbeam-switched channel and at least one interbeam-switched subchannelized channel, and wherein the switch is used to selectively connect either the interbeam-switched channel or the interbeam-switched subchannelized channel onto the channel switch output;
- a plurality of output multiplexers, each output multiplexer connected to at least one of the interbeam-switched channels and at least one channel switch output, the output of each output demultiplexer forming an output beam.

* * * * *